US006031236A

United States Patent [19]

Arakawa et al.

[11] Patent Number: 6,031,236

[45] Date of Patent: Feb. 29, 2000

[54] RADIATION IMAGE STORAGE PANEL FOR THE PREPARATION OF THE SAME

[75] Inventors: Satoshi Arakawa; Yuichi Hosoi; Katsuhiro Kohda; Kikuo Yamazaki, all of Kanagawa, Japan

[73] Assignee: Fuji Photo Film Co., Ltd., Kanagawa, Japan

[21] Appl. No.: 08/375,272

[22] Filed: Jan. 19, 1995

Related U.S. Application Data

[63] Continuation of application No. 08/249,476, May 26, 1994, abandoned, which is a continuation of application No. 08/043,995, Apr. 7, 1993, abandoned, which is a continuation of application No. 07/686,833, Apr. 17, 1991, abandoned, which is a division of application No. 07/462,337, Jan. 2, 1990, abandoned, which is a continuation of application No. 07/184,010, Apr. 20, 1988, abandoned.

[30] Foreign Application Priority Data

Apr. 20, 1987 [JP] Japan .................................... 62-96803

[51] Int. Cl.$^7$ .............................. G03B 42/02; G21K 4/00

[52] U.S. Cl. .......................................................... 250/484.4

[58] Field of Search .............................. 264/21; 427/226; 156/67; 250/484.4

[56] References Cited

U.S. PATENT DOCUMENTS

| | | | |
|---|---|---|---|
| 2,651,584 | 9/1953 | Longini et al. | 428/691 X |
| 3,567,922 | 3/1971 | Blair | 264/21 |
| 4,240,992 | 12/1980 | Petrie et al. | 264/21 |
| 4,420,444 | 12/1983 | Yamada et al. | 264/21 |
| 4,437,011 | 3/1984 | Noji et al. | 250/486.1 |
| 4,473,518 | 9/1984 | Minagawa et al. | 264/21 |
| 4,486,486 | 12/1984 | Maeoka et al. | 428/690 X |
| 4,501,796 | 2/1985 | Kitada | 428/690 X |
| 4,508,630 | 4/1985 | Ochiai | 428/690 X |
| 4,508,636 | 4/1985 | Ochiai | 252/301.36 |
| 4,510,174 | 4/1985 | Holzapfel et al. | 427/65 |
| 4,645,721 | 2/1987 | Arakawa et al. | 250/483.1 |
| 4,696,868 | 9/1987 | Ashi et al. | 428/690 |
| 4,733,089 | 3/1988 | Kitada et al. | 250/483.1 |
| 4,896,043 | 1/1990 | Arakawa et al. | 250/484.4 |
| 4,910,407 | 3/1990 | Arakawa et al. | 250/484.1 B |
| 4,922,105 | 5/1990 | Hosoi | 250/484.1 B |
| 4,952,813 | 8/1990 | Miyahara et al. | 250/483.1 |
| 5,024,791 | 6/1991 | Cusano et al. | 264/21 |

FOREIGN PATENT DOCUMENTS

| | | | |
|---|---|---|---|
| 0175578 | 3/1986 | European Pat. Off. | 250/484.4 |
| 0288038 | 10/1988 | European Pat. Off. | 250/484.4 |

*Primary Examiner*—Constantine Hannaher
*Attorney, Agent, or Firm*—Sixbey, Friedman, Leedom & Ferguson, P.C.; Gerald J. Ferguson, Jr.; Jeffrey L. Costellia

[57] ABSTRACT

A radiation image storage panel having a sintered or deposited stimulable phosphor layer is improved by impregnating the sintered or deposited phosphor layer with a thermosetting resin, an ultraviolet-curing resin or an electron beam-curing resin, and curing the impregnated resin.

5 Claims, 1 Drawing Sheet

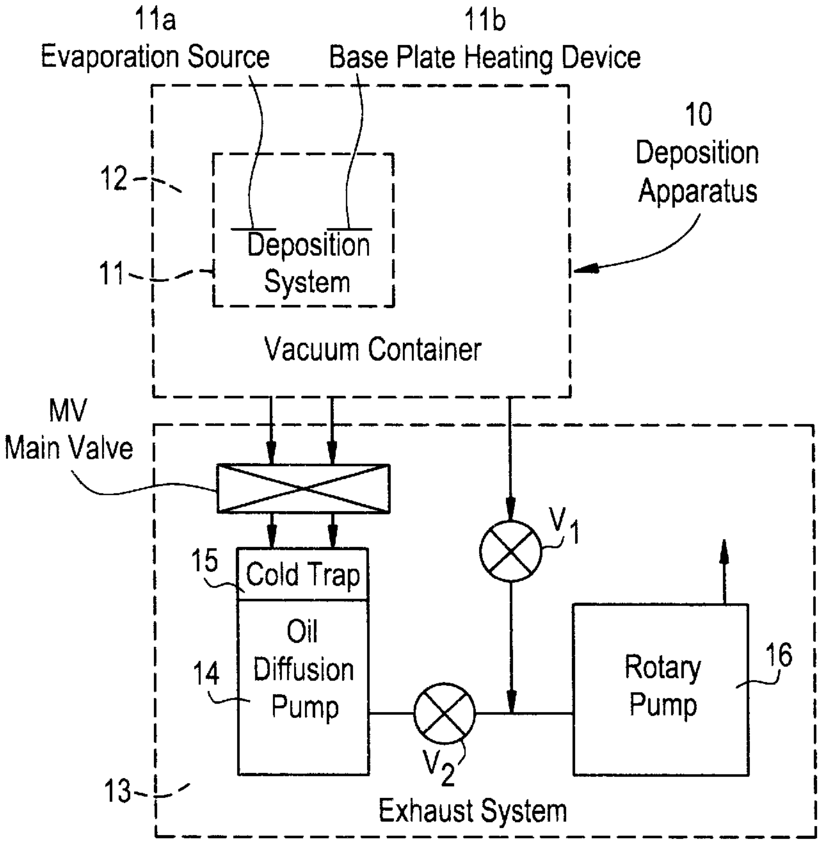
FIG. 1
FIG. 2
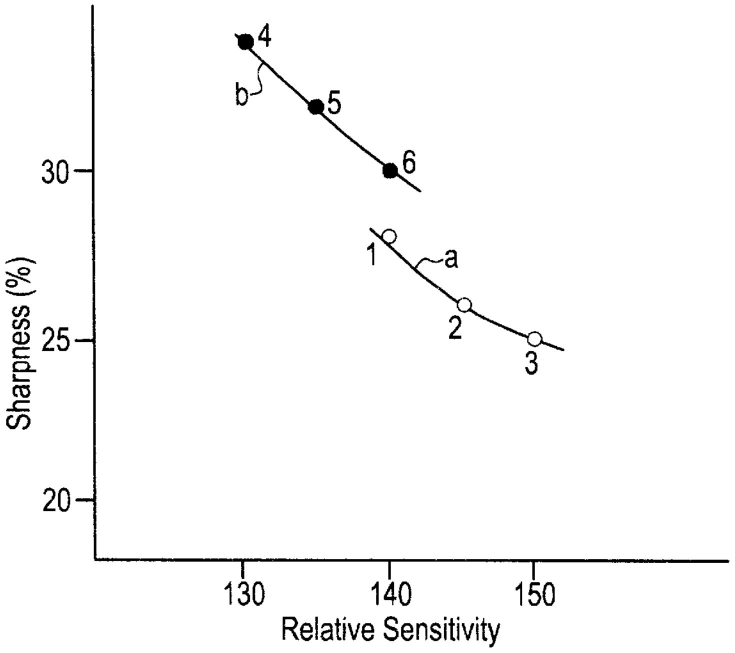

RADIATION IMAGE STORAGE PANEL FOR THE PREPARATION OF THE SAME

This application is a Continuation of Ser. No. 08/249,476, filed May 26, 1994 now abandoned, which itself was a continuation of Ser. No. 08/043,995, filed Apr. 7, 1993, now abandoned, which was a continuation of Ser. No. 07/686,833, filed Apr. 17, 1991, now abandoned; which was a divisional of Ser. No. 07/462,337 filed Jan. 2, 1990, now abandoned; which was a continuation of Ser. No. 07/184,010, filed Apr. 20, 1988, now abandoned.

BACKGROUND OF THE INVENTION

1. Field of the Invention

The present invention relates to a radiation image storage panel employed in a radiation image recording and reproducing method utilizing a stimulable phosphor, and a process for the preparation of said panel.

2. Description of Prior Art

For obtaining a radiation image, a radiation image recording and reproducing method utilizing a stimulable phosphor as described, for instance, in U.S. Pat. No. 4,239,968, has been proposed and practically used. In the method, a radiation image storage panel comprising a stimulable phosphor (i.e., stimulable phosphor sheet) is employed, and the method involves steps of causing the stimulable phosphor of the panel to absorb radiation energy having passed through an object or having radiated from an object; sequentially exciting the stimulable phosphor with an electromagnetic wave such as visible light or infrared rays (hereinafter referred to as "stimulating rays") to release the radiation energy stored in the phosphor as light emission (stimulated emission); photoelectrically detecting the emitted light to obtain electric signals; and reproducing the radiation image of the object as a visible image from the electric signals on a recording material such as a photographic film or a display device such as CRT.

According to this method, a radiation image is obtainable with a sufficient amount of information by applying a radiation to an object at considerably smaller dose, as compared with a conventional radiography employing a combination of a radiographic film and a radiographic intensifying screen. The method is of great value especially when the method is used for medical diagnosis.

The radiation image storage panel employed in the above-described method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer generally comprises a binder and a stimulable phosphor dispersed therein. The stimulable phosphor emits light (gives stimulated emission) when excited with an electromagnetic wave (stimulating rays) such as visible light or infrared rays after having been exposed to a radiation such as X-rays. Accordingly, the radiation having passed through an object or radiated from an object is absorbed by the phosphor layer of the panel in proportion to the applied radiation dose, and a radiation image of the object is produced in the panel in the form of a radiation energy-stored image. The radiation energy-stored image can be released as stimulated emission by sequentially irradiating the panel with stimulating rays. The stimulated emission is then photo-electrically detected to give electric signals, so as to reproduce a visible image from the electric signals.

The radiation image recording and reproducing method is very useful for obtaining a radiation image as a visible image as described hereinbefore. It is desired for the radiation image storage panel employed in the method to have a high sensitivity and provide an image of high quality (high sharpness, high graininess, etc.), as well as a radiographic intensifying screen employed in the conventional radiography.

The sensitivity of the radiation image storage panel is essentially determined by the total amount of stimulated emission given by the stimulable phosphor contained therein, and the total emission amount varies depending upon not only the emission luminance of the phosphor per se but also the content of the phosphor in the phosphor layer. The large content of the phosphor also results in the increase of absorption of a radiation such as X-rays, so that the panel has a higher sensitivity and provides an image of enhanced quality (especially graininess). On the other hand, when the content of the phosphor in the phosphor layer is the same, the panel provides an image of high sharpness as the phosphor layer is charged densely therewith, because the phosphor layer can be made thin to reduce the spread of the stimulating rays caused by the scattering.

The phosphor layer has been usually formed by adding stimulable phosphor particles and a binder to an appropriate solvent to prepare a coating dispersion, then applying the coating dispersion onto a support or a sheet using a known coating means such as a doctor blade or a roll coater, and drying the coated layer. Thus formed phosphor layer comprising the binder and the stimulable phosphor dispersed therein has a relative density (proportion by volume of the phosphor occupying the phosphor layer) limited to approx. 60%. Further, since the phosphor layer having the binder contains a great number of air bubbles, the stimulating rays and the emitted light tend to scatter.

There have been known methods for forming a phosphor layer which contains no binder and consists of only a stimulable phosphor. As a typical example of the known methods, there is a deposition method to form a phosphor layer. Further, U.S. Pat. No. 3,859,527 describes that a temporary storage medium comprises a hot pressed phosphor, and the amendment at the date of Sep. 11, 1985, which is disclosed in Japanese Patent Provisional Publication No. 61(1986)-73100, describes that a phosphor layer is formed by a firing process. However, both the descriptions merely indicate that the hot press process and the firing process can be employed to form the phosphor layer.

There has been filed by the present applicant a patent application for a radiation image storage panel comprising a support and a phosphor layer provided thereon which comprises a stimulable phosphor, characterized in that said phosphor layer consists essentially of a sintered stimulable phosphor and has a relative density of not less than 70%, and a process for the preparation of the same (U.S. patent application Ser. No.072,698).

SUMMARY OF THE INVENTION

It is an object of the present invention to provide a radiation image storage panel which is improved in the sensitivity and the mechanical strength, and a process for the preparation of the same.

It is another object of the present invention to provide a radiation image storage panel which is improved in the sensitivity and the mechanical strength and provides an image improved in the sharpness, and a process for the preparation of the same.

The present invention provides:

[1] a radiation image storage panel having a phosphor layer which comprises a stimulable phosphor, in which said phosphor layer is impregnated with a polymer material;

[2] a process for the preparation of a radiation image storage panel having a phosphor layer of a stimulable phosphor, which comprises the steps of molding a phosphor layer-forming material containing a stimulable phosphor into a sheet, sintering the molded product and then immersing the sintered product in a liquid of a polymer material to form a phosphor layer impregnated with the polymer material; and

[3] a process for the preparation of a radiation image storage panel comprising a support and a phosphor layer of a stimulable phosphor provided thereon, which comprises the steps of depositing a stimulable phosphor on the support to give a deposited film of the stimulable phosphor and then immersing the deposited film in a liquid of a polymer material to form a phosphor layer impregnated with the polymer material.

BRIEF DESCRIPTION OF THE DRAWINGS

FIG. 1 is a schematic view showing the constitution of a vacuum deposition apparatus employable in the formation of the phosphor layer according to the invention.

FIG. 2 graphically shows a relationship between the relative sensitivity and the sharpness with respect to the radiation image storage panel according to the present invention (measured points 1 to 3, Curve a) and the radiation image storage panels having a colored phosphor layer also according to the present invention (measured points 4 to 6, Curve b).

DETAILED DESCRIPTION OF THE INVENTION

In the present invention, a phosphor layer of a radiation image storage panel composed of a stimulable phosphor and containing no binder is formed through a sintering process or a deposition process to charge the phosphor into the phosphor layer at a high density. Further, the phosphor layer is impregnated with a polymer material in voids produced therein to enhance the bonding strength of the phosphor, whereby the resulting panel can be improved in the sensitivity and the mechanical strength.

In one aspect of the invention, the phosphor layer is formed by a process comprising the steps of molding a phosphor layer-forming material containing a stimulable phosphor into a sheet and sintering the obtained molded product (i.e., sintering process) or a deposition process, so that the stimulable phosphor in the sintered state or in the deposited state is densely packed as a whole to give a phosphor layer of a high relative density.

The phosphor layer obtained by the processes according to the invention does not contain any binder, and an extremely larger amount of the phosphor exists therein, as compared with a phosphor layer having the same thickness which is obtained by the conventional coating process, and hence the amount of the stimulated emission given by the whole phosphor layer is increased. Further, the amount of a radiation absorbed by the whole phosphor layer is increased, which also brings about the increase of the emission amount to enhance the sensitivity of the panel. Moreover, air bubbles (pores) are reduced in the phosphor layer, and such reduction of air bubbles results in decrease of the scattering of emitted light, whereby the detection efficiency of the emitted light is increased to enhance the sensitivity of the panel.

The increase of the absorption amount of a radiation per a phosphor layer also results in reducing the quantum noise of the radiation, to give an image of high graininess.

In another aspect of the invention, the phosphor layer is impregnated with a polymer material and the polymer material fills up the voids in the sintered or deposited stimulable phosphor (for example, grain boundary part and/or pore part of the phosphor in the case of a sintered phosphor layer), so that the phosphor layer hardly suffers cracks even when an external force (or pressure) is applied thereto.

A phosphor layer formed by the sintering process or the deposition process is packed with a stimulable phosphor at a high density and has a high rigidness, and on the other hand, the phosphor layer easily cracks or breaks even when an external force is slightly applied thereto. According to the invention, the polymer material is charged into the voids of the phosphor layer to allow the phosphor particles to keep the bonding strength thereamong, and thereby the resulting panel does not suffer cracks or breakages on the phosphor layer even when an external force such as a shock is applied thereto in the transferring procedure, that is, the panel is improved in the mechanical strength and handling property.

Further, charging of the polymer material into the voids of the stimulable phosphor much more reduces the pores in the phosphor layer, so that the emitted light can be prominently prevented from being scattered to increase the detection efficiency of the emitted light, whereby the panel is increased in the sensitivity. That is, the radiation image storage panel of the present invention is higher in the sensitivity as compared with the conventional one comprising a phosphor layer which consists of only the stimulable phosphor.

In the impregnation procedure of the polymer material into the phosphor layer of the radiation image storage panel according to the invention, a colorant capable of at least a portion of stimulating rays may be incorporated into the polymer material. Thus, a colored phosphor layer is obtained.

Since a phosphor layer formed by the sintering process or the deposition process has a high density of the stimulable phosphor, the mean free path of stimulating rays in the phosphor layer is made longer to widely spread the scattered stimulating rays, resulting in lowering of the sharpness of an obtained image. According to the invention, the scattered stimulating rays are absorbed by the colorant in the phosphor layer, so that the image quality such as sharpness can be prominently prevented from lowering.

Moreover, the phosphor layer can be easily colored to a desired extent by impregnation of the colorant into the phosphor layer with the polymer material. The colorant exists in the grain boundary part and/or the pore part, being adsorbed on the surface of the phosphor, so that the phosphor layer is colored uniformly to give an image of remarkably improved sharpness.

The radiation image storage panel of the present invention having the above-described advantages are prepared, for example, by the process of the invention described below.

A phosphor layer, which is the characteristic requisite of the invention, consists essentially of a stimulable phosphor and is impregnated with a polymer material in voids of the stimulable phosphor.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO•x$Al_2O_3$:Eu, in which x is a number satisfying the condition of $0.8 \leqq x \leqq 10$, and $M^{2+}O$•x$SiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0<x+y \leqq 0.6$ and $xy \neq 0$, and a is a number satisfying the condition of $10^{-6} \leqq a \leqq 5\times10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0<x<0.1$, as described in the above-mentioned U.S. Pat. No. 4,236,078;

$(Ba_{1-x},M^{2+}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}FX$•xA:yLn, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5\times10^{-5} \leqq x \leqq 0.5$ and $0<y \leqq 0.2$, respectively, as described in Japanese Patent Provisional Publication No. 55(1980)-160078;

$(Ba_{1-x},M^{II}_x)F_2$•a$BaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leqq a \leqq 1.25$, $0 \leqq x \leqq 1$, $10^{-6} \leqq y \leqq 2\times10^{-1}$, and $0<z \leqq 10^{-2}$, respectively, as described in Japanese Patent Provisional Publication No. 56(1981)-116777;

$(Ba_{1-x},M^{II}_x)F_2$•a$BaX_2$:yEu,zB, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leqq a \leqq 1.25$, $0 \leqq x \leqq 1$, $10^{-6} \leqq y \leqq 2\times10^{-1}$, and $0<z \leqq 2\times10^{-1}$, respectively, as described in Japanese Patent Provisional Publication No. 57(1982)-23673;

$(Ba_{1-x},M^{II}_x)F_2$•a$BaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leqq a \leqq 1.25$, $0 \leqq x \leqq 1$, $10^{-6} \leqq y \leqq 2\times10^{-1}$, and $0<z \leqq 5\times10^{-1}$, respectively, as described in Japanese Patent Provisional Publication No. 57(1982)-23675;

$M^{III}OX$:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58(1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leqq x \leqq 0.5$ and $0<y \leqq 0.1$, respectively, as described in U.S. patent application Ser. No. 841,044;

BaFX•xA:y$Eu^{2+}$, in which X is at least one halogen selected from the group consisting of Cl, Br and I; A is at least one fired product of a tetrafluoroboric acid compound; and x and y are numbers satisfying the conditions of $10^{-6} \leqq x \leqq 0.1$ and $0<y \leqq 0.1$, respectively, as described in U.S. patent application Ser. No. 520,215;

BaFX•xA:y$Eu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leqq x \leqq 0.1$ and $0<y \leqq 0.1$, respectively, as described in U.S. patent application Ser. No. 502,648;

BaFX•xNaX':a$Eu^{2+}$, in which each of X and X' is at least one halogen selected from the group consisting of Cl, Br and I; and x and a are numbers satisfying the conditions of $0<x \leqq 2$ and $0<a \leqq 0.2$, respectively, as described in Japanese Patent Provisional Publication No. 59(1984)-56479;

$M^{II}FX$•xNaX':y$Eu^{2+}$:zA, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x \leqq 2$, $0<y \leqq 0.2$ and $0<z \leqq 10^{-2}$, respectively, as described in U.S. Pat. No. 4,505,989;

$M^{II}FX$•a$M^{I}X'$•b$M'^{II}X''_2$•c$M^{III}X'''_3$•xA:y$Eu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0 \leqq a \leqq 2$, $0 \leqq b \leqq 10^{-2}$, $0 \leqq c \leqq 10^{-2}$ and $a+b+c \geqq 10^{-6}$; and x and y are numbers satisfying the conditions of $0<x \leqq 0.5$ and $0<y \leqq 0.2$, respectively, as described in U.S. patent application Ser. No. 857,512;

$M^{II}X_2 \cdot aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, Br and I, and $X \neq X'$; and a and x are numbers satisfying the conditions of $0.1 \leqq a \leqq 10.0$ and $0 < x \leqq 0.2$, respectively, as described in U.S. patent application Ser. No. 834,886;

$M^{II}FX \cdot aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0 \leqq a \leqq 4.0$ and $0 < x \leqq 0.2$, respectively, as described in U.S. patent application Ser. No. 814,028;

$M^{I}X:xBi$, in which $M^{I}$ is at least one alkali metal selected from the group consisting of Rb and Cs; X is at least one halogen selected from the group consisting of Cl, Br and I; and x is a number satisfying the condition of $0 < x \leqq 0.2$, as described in U.S. patent application Ser. No. 846,919; and alkali metal halides described in Japanese Patent Provisional Publications No. 61(1986)-72087 and No. 61(1986)-72088.

The $M^{II}X_2 \cdot aM^{II}X'_2:xEu^{2+}$ phosphor described in U.S. patent application Ser. No. 660,987 may further contain the following additives in the following amount per 1 mol of $M^{II}X_2 \cdot aM^{II}X'_2$:

$bM^{I}X''$, in which $M^{I}$ is at least one alkali metal selected from the group consisting of Rb and Cs; X" is at least one halogen selected from the group consisting of F, Cl, Br and I; and b is a number satisfying the condition of $0 < b \leqq 10.0$, as described in U.S. patent application Ser. No. 699,325;

$bKX'' \cdot cMgX'''_2 \cdot dM^{III}X''''_3$, in which $M^{III}$ is at least one trivalent metal selected from the group consisting of Sc, Y, La, Gd and Lu; each of X", X"' and X"" is at least one halogen selected from the group consisting of F, Cl, Br and I; and b, c and d are numbers satisfying the conditions of $0 \leqq b \leqq 2.0$, $0 \leqq c \leqq 2.0$, $0 \leqq d \leqq 2.0$ and $2 \times 10^{-5} \leqq b+c+d$, as described in U.S. patent application Ser. No. 847,631;

yB, in which y is a number satisfying the condition of $2 \times 10^{-4} \leqq y \leqq 2 \times 10^{-1}$, as described in U.S. patent application Ser. No. 727,974;

bA, in which A is at least one oxide selected from the group consisting of $SiO_2$ and $P_2O_5$; and b is a number satisfying the condition of $10^{-4} \leqq b \leqq 2 \times 10^{-1}$, as described in U.S. patent application Ser. No. 727,972;

bSiO, in which b is a number satisfying the condition of $0 < b \leqq 3 \times 10^{-2}$, as described in U.S. patent application Ser. No. 797,971;

$bSnX''_2$, in which X" is at least one halogen selected from the group consisting of F, Cl, Br and I; and b is a number satisfying the condition of $0 < b \leqq 10^{-3}$, as described in U.S. patent application Ser. No. 797,971;

$bCsX'' \cdot cSnX'''_2$, in which each of X" and X"' is at least one halogen selected from the group consisting of F, Cl, Br and I; and b and c are numbers satisfying the conditions of $0 < b \leqq 10.0$ and $10^{-6} \leqq c \leqq 2 \times 10^{-2}$, respectively, as described in U.S. patent application Ser. No. 850,715; and $bCsX'' \cdot yLn^{3+}$, in which X" is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0 < b \leqq 10.0$ and $10^{-6} \leqq y \leqq 1.8 \times 10^{-1}$, respectively, as described in U.S. patent application Ser. No. 850,715.

Among the above-described stimulable phosphors, the divalent europium activated alkaline earth metal halide phosphor and the rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

The phosphor layer can be obtained, for example, by forming a layer composed of only the stimulable phosphor (i.e., sintered product or deposited film) through a sintering process or a deposition process and then impregnating the layer with a polymer material.

In the case of the sintering process, the phosphor layer can be formed by the process comprising the steps of (1) molding a phosphor layer-forming material containing a stimulable phosphor into a sheet, and (2) sintering the molded product.

In the first procedure of molding, a powder material comprising particles of the above-described stimulable phosphor is employed as the phosphor layer-forming material.

A dispersion containing stimulable phosphor particles and a binder can be also employed. In this case, the stimulable phosphor particles and the binder are added to an appropriate solvent, and they are well mixed to prepare a dispersion in which the phosphor particles are homogeneously dispersed in a binder solution.

The binder is preferably selected from materials having excellent properties such as high dispersibility of phosphor and high exhalation in the succeeding sintering procedure. Examples of the binder include paraffin such as paraffin having 16–40 carbon atoms and a melting point of 37.8–64.5° C.; wax such as natural wax (e.g., vegetable wax such as candelilla wax, carnauba wax, rice wax and Japan wax; animal wax such as beeswax, lanolin and whale wax; and mineral wax such as montan wax, ozocerite and ceresin) and synthetic wax (e.g., coal wax such as polyethylene wax and Fischer-Tropsch wax; and oil wax such as curing castor oil, fatty acid amide and ketone); and resins such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane cellulose acetate butylate, polyvinyl alcohol and linear polyester. Also employed are proteins such as gelatin, polysaccharides such as dextran and gum arabic.

Examples of the solvent employable in the preparation of the dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the stimulable phosphor in the dispersion is determined according to the nature of the phosphor employed or conditions in the molding and sintering procedures described hereinafter. Generally, the ratio therebetween is within the range of from 1:1 to 1:300 (binder:phosphor, by weight), preferably from 1:20 to 1:150.

The dispersion may contain a dispersing agent to assist the dispersibility of the phosphor particles therein. Examples of the dispersing agent include phthalic acid, stearic acid, caproic acid and a hydrophobic surface active agent.

In the case that the phosphor layer-forming material is a powder material, a molding tool is charged with the powder material to mold the material into a sheet. As the molding tool, a rectangular metal mold is generally employed. In the case that the phosphor layer-forming material is a dispersion, the dispersion is applied onto an appropriate substrate by the known coating method such as a method using a doctor blade to be molded into a sheet. Alternatively, the dispersion is introduced into the molding tool and molded into a sheet in the same manner as the case of the powder material. Examples of the substrate include sheets of inorganic materials such as quartz, zirconia, alumina and silicon carbide.

During the molding procedure, the phosphor layer-forming material may be subjected to a compression treatment, especially in the case of the powder material. The compression treatment is carried out for example by press molding, wherein the forming material is preferably applied with a pressure ranging $1\times10^2$ to $1\times10^4$ kg./cm$^2$. Through the compression treatment, the resulting phosphor layer is further enhanced in the relative density.

In the second place, the molded product in the form of sheet (i.e. molded sheet) is subjected to a sintering procedure.

The sintering is performed using a firing furnace such as an electric furnace. Temperature and time for the sintering are determined according to the kind of the phosphor layer-forming material, the shape and the state of the sheet-form molded product and the nature of the employed stimulable phosphor. When the molded sheet is composed of the powder material comprising the stimulable phosphor, the sintering temperature is generally in the range of 500 to 1,000° C., preferably in the range of 700 to 950° C. The sintering time is generally in the range of 0.5 to 6 hours, preferably in the range of 1.5 to 2 hours. As the sintering atmosphere, there can be employed an inert atmosphere such as a nitrogen gas atmosphere and an argon gas atmosphere, or a weak reducing atmosphere such as a nitrogen gas atmosphere containing a small amount of hydrogen gas and a carbon dioxide atmosphere containing carbon monoxide.

When the molded sheet is composed of the dispersion containing the stimulable phosphor and the binder, it is preferred that the binder therein is previously vaporized at a relatively low temperature (temperature in the range of 100 to 450° C.) in an inert atmosphere such as a nitrogen gas atmosphere and an argon gas atmosphere, or an oxidizing atmosphere such as an oxygen gas atmosphere and an air atmosphere. Successively, the phosphor is sintered under the above-described conditions. Through the vaporization in the relatively low temperature range, the components other than the stimulable phosphor such as the binder are vaporized or carbonized and further extinguish as a carbon dioxide gas. Thus, the other components can be readily removed from the dispersion, to form a sintered product (sintered phosphor layer) consisting of only the stimulable phosphor. The time required for the low-temperature vaporization is preferably in the range of 0.5 to 6 hours.

The compression treatment may be carried out prior to the sintering procedure as described above, and the treatment can be also performed during the sintering procedure. That is, the molded sheet may be sintered while being compressed. This is particularly preferred when the molded sheet is made of the powder material of phosphor particles.

The grain boundary size of the stimulable phosphor is preferably in the range of 1 to 100 μm.

In the case of the deposition process, the above-described stimulable phosphor is deposited onto a support through a vacuum deposition, etc. to form a deposited film (i.e., phosphor layer) composed of the stimulable phosphor.

The vacuum deposition can be carried out using a vacuum deposition apparatus as shown in FIG. 1. FIG. 1 schematically shows an example of the vacuum deposition apparatus.

In FIG. 1, the vacuum deposition apparatus 10 comprises a deposition system 11 for performing the vacuum deposition, a vacuum container 12 constituting a body of the apparatus and an exhaust system 13 for making the container 12 vacuum. The exhaust system 13 comprises an oil diffusion pump 14, a liquid nitrgen-cooling cold trap 15 and an oil rotary pump 16. The exhaust system 13 is connected to the apparatus body by means of a main valve (MV) and other valves ($V_1$, $V_2$). The deposition system 11 further comprises an evaporation source 11*a* and a base plate-heating device 11*b*.

The deposition process is performed using the above-described apparatus in the following manner.

In the first place, the powdery stimulable phosphor is introduced into a molybdenum boat, namely the evapolation source 11*a,* equipped in the deposition system 11. At the same time, a substrate (i.e., support) on which the phosphor is to be deposited is also placed at the determined position of the deposition system 11. Then the exhaust system 13 is driven to set the vapor pressure within the vacuum container 12 to a desired level (not higher than $10^{-6}$ Torr), so as to perform deposition of the stimulable phosphor onto the substrate.

The deposition is carried out by heating the substrate to a pre-determined temperature (e.g., temperature in the range of 25 to 400° C.) prior to driving the exhaust system 13 or heating the molybdenum boat. The deposition speed of the powdery phosphor is generally in the range of approx. 200 to 4,400 angstroms/min.

Thus, a deposited film of the stimulable phosphor is formed on the substrate.

Generally, a surface of the substrate (support) on which the stimulable phosphor is to be deposited is subjected to a washing procedure prior to performing the above-described deposition process. The washing of the substrate can be done by a conventional washing method such as a ultrasonic washing method, a vapor washing method or a combination method thereof. In any of those washing methods, there can be optionally employed washing agents, chemicals, solvents, etc.

The formation of the deposited film by the vacuum deposition process can be carried out according to the process described in "ELECTRONICS AND OPTICS", Thin Solid Film, 115 (1984) 89–95, by P. F. Carcia and L. H. Brixner.

The sintered product or the deposited film of the stimulable phosphor (i.e., phosphor layer) obtained in the above-described process preferably has a relative density of not less than 70%.

The relative density of the sintered product or the deposited film is determined theoretically by the following formula (I):

$$V_p/V=aA/(a+b)\rho_x V \quad \text{(I)}$$

in which each symbol is as follows:

V: whole volume of phosphor layer, $V_p$: volume of phosphor,

A: whole amount of phosphor layer, $\rho_x$: density of phosphor, a: weight of phosphor, and b: weight of binder.

In the present specification, the relative density of the phosphor layer means a value calculated by the formula (I). In the case of the sintering process, b in the formula (I) is almost 0, since the binder hardly exists in the phosphor layer prepared by sintering. In the case of the deposition process, b in the formula (I) is 0, since no binder is employed in the process.

The above-described sintering process and deposition process are given by no means to restrict the process employable for the formation of a phosphor layer comprising only a stimulable phosphor, and any other processes can be also employed provided that they can form a layer composed substantially only of a stimulable phosphor at a high density.

Subsequently, the layer of the stimulable phosphor such as the sintered product or the deposited film is impregnated with a polymer material.

Examples of the polymer materials include thermosetting resins of cold-setting type or heat-setting type, ultraviolet (UV) curing resins and electron beam (EB) curing resins. These resins are well known, and the polymer material employed in the invention can be optionally selected from these known resins.

For impregnating the polymer material, the layer of the stimulable phosphor is immersed in a liquid of the polymer material (including a material capable of being polymerized through polymerization curing such as the above-mentioned curing resins) for a short period of time (e.g., for several seconds to several minutes). The immersing is preferably done at a reduced pressure or under vacuum. The immersed layer is then heated or irradiated with ultraviolet rays or an electron beam to cure the polymer material. When the molded sheet is formed on the substrate by coating, the sintered product thereof is immersed in the liquid of polymer material after separating it from the substrate. In the case that the deposited film is formed on the support, the film is immersed in the liquid together with the support. The polymer material is impregnated in such a manner that the voids produced in the layer of the stimulable phosphor are filled up with the polymer material. For example, the polymer material is charged into the grain boundaries and/or pores of the stimulable phosphor in the case of the sintered product.

The thickness of the obtained phosphor layer varies depending upon the characteristics of the aimed radiation image storage panel, etc. Generally, the thickness thereof prepared by the sintering process is in the range of 20 $\mu$m to 1 mm, preferably in the range of 50 to 500 $\mu$m. The thickness thereof prepared by the deposition process is generally in the range of 10 to 500 $\mu$m, preferably in the range of 20 to 250 $\mu$m.

In the present invention, the phosphor layer may be colored with a colorant.

The colorant employable for coloring the phosphor layer absorbs at least a portion of the stimulating rays for causing the stimulable phosphor contained in the phosphor layer to give stimulated emission. The colorant preferably has such reflection characteristics that the mean reflectance thereof in the region of the stimulation wavelength of the stimulable phosphor is lower than the mean reflectance thereof in the region of the emission (stimulated emission) wavelength of the stimulable phosphor.

From the viewpoint of the sharpness of the resultant image, it is desired that the mean reflectance of the colorant in the region of the stimulation wavelength is as low as possible. Generally, the mean reflectance of the colored phosphor layer in said wavelength region is not higher than 95% of the mean reflectance of a phosphor layer equivalent to said phosphor layer except for being uncolored in the same wavelength region. On the other hand, from the viewpoint of the sensitivity of the panel, it is desired that the mean reflectance of the colorant in the region of the emission wavelength is as high as possible. Generally, the mean reflectance of the colored phosphor layer in said wavelength region is not lower than 30% of the mean reflectance of a phosphor layer equivalent to said phosphor layer except for being uncolored in the same wavelength region, and preferably not lower than 90% thereof. The term "reflectance" used herein means a reflectance measured by use of an integrating-sphere photometer.

Accordingly, the preferred colorant depends on the stimulable phosphor employed in the radiation image storage panel. From the viewpoint of practical use, the stimulable phosphor is desired to give stimulated emission in the wavelength region of 300–500 nm when excited with stimulating rays in the wavelength region of 400–900 nm as mentioned above. Employable for such a stimulable phosphor is a colorant having a body color ranging from blue to green, so that the mean reflectance thereof in the region of the stimulation wavelength of the phosphor is lower than the mean reflectance thereof in the region of the emission wavelength of the phosphor and the difference therebetween is as large as possible.

Examples of the colorant having a body color ranging from blue to green (dye and pigment) employed in the invention include the colorants disclosed in U.S. Pat. No. 4,394,581, that is: organic colorants such as Zapon Fast Blue 3G (available from Hoechst AG), Estrol Brill Blue N-3RL (available from Sumitomo Chemical Co., Ltd.), Sumiacryl Blue F-GSL (available from Sumitomo Chemical Co., Ltd.), D & C Blue No.1 (available from National Aniline), Spirit Blue (available from Hodogaya Chemical Co., Ltd.), Oil Blue No.603 (available from Orient Co., Ltd.), Kiton Blue A (available from Ciba-Geigy), Aizen Cathilon Blue GLH (available from Hodogaya Chemical Co, Ltd.), Lake Blue A.F.H (available from Kyowa Sangyo Co., Ltd.), Rodalin Blue 6GX (available from Kyowa Sangyo Co., Ltd.), Primocyanine 6GX (available from Inahata Sangyo Co., Ltd.), Brillacid Green 6BH (available from Hodogaya Chemical Co., Ltd.), Cyanine Blue BNRS (available from Toyo Ink Mfg. Co., Ltd.), Lionol Blue SL (available from Toyo Ink Mfg. Co., Ltd.), and the like; and inorganic colorants such as ultramarine blue, cobalt blue, cerulean-b blue, chromium oxide, $TiO_2$-ZnO-CoO-NiO pigment, and the like.

Examples of the colorant employable in the present invention also include the colorants described in U.S. patent application Ser. No. 326,642, that is: organic metal complex salt colorants having Color Index No. 24411, No. 23160, No. 74180, No. 74200, No. 22800, No. 23150, No. 23155, No. 24401, No. 14880, No. 15050, No. 15706, No. 15707, No. 17941, No. 74220, No. 13425, No. 13361, No. 13420, No. 11836, No. 74140, No. 74380, No. 74350, No. 74460, and the like.

Among the above-mentioned colorants having a body color of from blue to green, particularly preferred are the organic metal complex salt colorants which show no emission in the longer wavelength region than that of the stimulating rays as described in the latter U.S. patent application Ser. No. 326,642.

The coloring of the phosphor layer can be made in the same place where the polymer material is impregnated into the layer of the stimulable phosphor (i.e., sintered product or deposited film). The above-mentioned colorant is dissolved or dispersed in the polymer material to prepare a liquid (solution or dispersion) of the polymer material containing the colorant. In the liquid of the polymer material containing the colorant is immersed the layer of the stimulable phosphor and the polymer material is then cured in the same manner as described before, whereby the colorant stably remains in the grain boundaries and/or the pores of the stimulable phosphor.

When the colorant is a dispersible one (i.e., pigment), the amount of the colorant in the liquid of the polymer material is generally in the range of 0.01 to 100 mg., preferably in the range of 0.1 to 10 mg., per 1 g. of the polymer material. When the colorant is a soluble one (i.e., dye), the amount of the colorant in the liquid of the polymer material is generally in the range of 0.01 to 100 $\mu$g., preferably in the range of 0.1 to 10 $\mu$g., per 1 g. of the polymer material. The coloring degree of the phosphor layer can be suitably controlled by changing the concentration of the liquid containing the colorant, etc.

As for the radiation image storage panel of the invention, one or more layers constituting the panel other than the phosphor layer, for example, a support, a subbing layer, a light-reflecting layer, an adhesive layer and a protective film, may be further colored with the same colorant as employed for coloring the phosphor layer.

The phosphor layer is preferably provided with a support on one surface. When the phosphor layer is prepared by the deposition process, the phosphor layer is always formed on the support in the course of deposition as described hereinbefore.

A support material employable in the invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal foils such as aluminum foil and aluminum alloy foil; metal sheet; ceramic sheet; ordinary papers; baryta paper; resin-coated papers; pigment papers containing titanium dioxide or the like; and papers sized with polyvinyl alcohol or the like. The support may contain a light-absorbing material such as carbon black, or may contain a light-reflecting material such as titanium dioxide. The former is appropriate for preparing a high-sharpness type panel, while the latter is appropriate for preparing a high-sensitivity type panel.

In the case of providing a support on the phosphor layer, one or more additional layers are occasionally provided between the support and the phosphor layer. For instance, an adhesive layer may be provided by coating a polymer material such as gelatin over the surface of the support on the phosphor layer-side to enhance the adhesion therebetween. A light-reflecting layer containing a light-reflecting material such as titanium dioxide or a light-absorbing layer containing a light-absorbing material such as carbon black may be provided on the support to improve the sensitivity of the panel and the quality of an image (sharpness and graininess) provided by the panel. The phosphor layer-side surface of the support (or the surface of an adhesive layer, light-reflecting layer or light-absorbing layer in the case that such layers are provided on the surface of the support) may be provided with protruded and depressed portions for enhancement of the sharpness of an image, as described in U.S. patent application Ser. No. 496,278.

The support is provided on the phosphor layer by coating a surface of the support with an adhesive agent and fixing the phosphor layer thereon. Alternatively, the molded sheet obtained in the molding procedure may be placed on the support and then sintered, so that the support can be provided at the same time as the phosphor layer is formed. When forming the molded sheet by coating, a support can be employed as the substrate. In these cases, the impregnation of the polymer material and further the colorant into the phosphor layer is performed by immersing the substrate having the sintered product in the liquid of polymer material.

On the other surface of the phosphor layer, a transparent protective film may be provided to protect the phosphor layer physically and chemically.

The transparent protective film can be formed on the phosphor layer by coating the surface of the phosphor layer with a solution of a transparent polymer such as a cellulose derivative (e.g. cellulose acetate or nitrocellulose) or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the protective film can be provided on the phosphor layer by beforehand preparing a film for forming a protective film from a plastic sheet made of polyethylene terephthalate, polyethylene, polyvinylidene chloride or polyamide; or a transparent glass sheet, followed by placing and fixing it onto the phosphor layer with an appropriate adhesive agent. The transparent protective film preferably has a thickness within the range of approx. 0.1 to 20 $\mu$m.

Examples and comparison examples of the present invention are given below, but these examples are understood to by no means restrict the invention.

EXAMPLE 1

To a mixture of divalent europium activated barium fluorobromide ($BaFBr:0.001Eu^{2+}$) phosphor particles and an acrylic resin was added methyl ethyl ketone to prepare a dispersion containing the phosphor particles and the binder in the ratio of 20:1 (phosphor:binder, by weight). The dispersion was sufficiently stirred by means of a propeller agitater to obtain a homogeneous coating dispersion having a viscosity of 35–50 PS (at 25° C.).

Subsequently, the coating dispersion was evenly applied to a Teflon sheet placed horizontally by using a doctor blade. After the coating was complete, the Teflon sheet having a coated layer of the dispersion thereon was placed in an oven and dried at a temperature gradually rising from 25 to 100° C. After drying, the coated layer (film) was separated from the Teflon sheet. The separated film was placed on a quartz plate, and the quartz plate having the film was placed in a high-temperature electric furnace to perform vaporization of the binder and sintering of the phosphor. The vaporization of the binder was carried out at 400° C. for 4 hours in air, and then, the sintering of the phosphor was carried out at 650° C. for 2 hours in a nitrogen gas atmosphere. The sintered product was then taken out of the furnace and allowed to stand for cooling, to obtain a sintered product composed of only the phosphor.

Subsequently, the sintered product was placed in a sealed container and the inside of the container was made vacuum by means of a rotary pump. In the vacuum container, the sintered product was immersed in a liquid of a thermosetting resin (RTV rubber, trade name: KE109, A liquid:B liquid=

1:1, available from Shinetsu Chemical Industries Co., Ltd.). Thereafter, the sintered product was taken out of the container and then the surplus resin was removed from the sintered product. The sintered product was then heated at a temperature of 120° C. for 2 hours to cure the resin, to obtain a phosphor layer of 200 μm thick impregnated with the thermosetting resin.

One surface of the phosphor layer was combined with an aluminum oxide plate (support, thickness: 1 mm) using a polyester adhesive to provide a support on the phosphor layer.

On the other surface of the phosphor layer (opposite side surface of the support side) was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a phosphor layer and a protective film.

EXAMPLES 2 & 3

The procedure of Example 1 was repeated except for changing the temperature for sintering the phosphor to 750° C. and 850° C., to prepare two kinds of radiation image storage panels consisting essentially of a support, a phosphor layer and a protective film.

COMPARISON EXAMPLES 1–3

Each procedure of Examples 1 to 3 was repeated except for not impregnating the sintered product with the thermosetting resin, to prepare three kinds of radiation image storage panels consisting essentially of a support, a phosphor layer and a protective film.

The radiation image storage panels obtained in the above-described examples were determined on the relative density of the phosphor layer by calculating based on the aforementioned formula (I). The density of the phosphor was 5.18 g./cm$^3$.

Then, the radiation image storage panels were evaluated on the sensitivity and the handling property (i.e., resistance to external force applied to the panel) according to the following tests.

(1) Sensitivity

The radiation image storage panel was excited with a He-Ne laser beam after exposure to X-rays at voltage of 80 KVp , to measure the sensitivity.

(2) Handling Property

The radiation image storage panel was carried at several times with hands, and then the change of the surface condition of the phosphor layer caused by the external force applied to the panel was observed through eye judgment.

The results of the evaluations on the sensitivity and the handling property are set forth in Table 1.

TABLE 1

| | Sintering Temperature (°C.) | Relative Density (%) | Relative Sensitivity | Handling Property |
|---|---|---|---|---|
| Example 1 | 650 | 75 | 140 | good |
| 2 | 750 | 88 | 145 | good |
| 3 | 850 | 93 | 150 | good |
| Com. Ex. 1 | 650 | 75 | 100 | bad |
| 2 | 750 | 88 | 120 | bad |
| 3 | 850 | 93 | 130 | bad |

As is evident from the results set forth in Table 1, all of the panels having a phosphor layer impregnated with the polymer material according to the present invention (Examples 1 to 3) were remarkably enhanced in the sensitivity and showed excellent handling property, as compared with the panels for comparison having a phosphor layer impregnated with no polymer material (Comparison Examples 1 to 3).

EXAMPLES 4–6

Each procedure of Examples 1 to 3 was repeated except for dispersing ultramarine blue (colorant) in the thermosetting resin in an amount of 1 mg. per 1 g. of the resin and then immersing the sintered product in the resin dispersion containing the colorant, to prepare three kinds of radiation image storage panels consisting essentially of a support, a colored phosphor layer and a protective film.

The radiation image storage panels obtained in Examples 4 to 6 were evaluated on the sensitivity according to the above-described test and further evaluated on the sharpness of images provided by the panels according to the following test.

(1) Sharpness of Image

The radiation image storage panel was exposed to X-rays at voltage of 80 KVp through a CTF chart and then scanned with a He-Ne laser beam (wavelength: 633 nm) to excite the phosphor contained in the panel. The light emitted by the phosphor layer of the panel was detected and converted to electric signals by means of a photo-sensor (photomultiplier having spectral sensitivity of type S-5). From the electric signals, a radiation image of the CTF chart was reproduced as a visible image on a display device. The contrast transfer function (CTF) value of the visible image was determined, and the sharpness was evaluated by the CTF value at a spatial frequency of 2 cycle/mm.

The results of the evaluations on the sensitivity and the sharpness of an image are shown in FIG. 2 and set forth in Table 2, in which the results on the radiation image storage panels of Examples 1 to 3 are also shown and set forth for comparison.

FIG. 2 shows a graph in which the relative sensitivity is plotted as abscissa and the sharpness is plotted as ordinate.

In FIG. 2, measured points 1 to 6 indicate the results on the radiation image storage panels according to the present invention. The measured points 1 to 3 (marked by ○) indicate the results on the panels having a phosphor layer impregnated with the thermosetting resin (Examples 1–3), respectively, and the measured points 4 to 6 (marked by ●) indicate the results on the panels having a colored phosphor layer impregnated with the thermosetting resin (Examples 4–6), respectively. Each of Curve a and Curve b given along the measured points 1 to 3 and along the measured points 4 to 6, respectively, indicates a relationship between the relative sensitivity and the sharpness with respect to the radiation image storage panel according to the invention.

TABLE 2

| | Relative Sensitivity | Sharpness (%) |
|---|---|---|
| Example 1 | 140 | 28 |
| 2 | 145 | 26 |
| 3 | 150 | 25 |
| Example 4 | 130 | 34 |
| 5 | 135 | 32 |
| 6 | 140 | 30 |

As is evident from the results shown in FIG. 2 and set forth in Table 2, the radiation image storage panels having a colored phosphor layer according to the present invention (Examples 4 to 6) provided images of higher sharpness than the panels having an uncolored phosphor layer (Examples 1 to 3) when the sensitivity thereof was the same, and the panels having a colored phosphor layer had a higher sensitivity than the panels having an uncolored phosphor layer when the sharpness of images provided thereby was the same.

We claim:

1. A radiation image storage panel having a sheet of stimulable phosphor comprising a sintered stimulable phosphor and a cured resin, which is prepared by the steps of forming a sheet of a powder comprising the stimulable phosphor, firing the sheet to give a sintered sheet of the stimulable phosphor, impregnating the sintered sheet with a thermosetting resin, an ultraviolet-curing resin or an electron beam-curing resin, and curing the impregnated resin.

2. The radiation image storage panel of claim 1, wherein the step of the firing is performed at a temperature in the range of 500 to 1,000° C. in an inert atmosphere or a reducing atmosphere.

3. A radiation image storage panel having a sheet of a stimulable phosphor comprising a sintered stimulable phosphor and a cured resin, which is prepared by the steps of forming a layer of a dispersion comprising the stimulable phosphor in a solution of a binder polymer, firing the layer to give a sintered sheet of the stimulable phosphor, impregnating the sintered sheet with a thermosetting resin, an ultraviolet-curing resin or an electron beam-curing resin, and curing the impregnated resin.

4. The radiation image storage panel of claim 3, wherein the step of the firing is performed at a temperature in the range of 500 to 1,000° C. in an inert atmosphere or a reducing atmosphere.

5. A radiation image storage panel having on a support a sheet of a stimulable phosphor comprising a deposited stimulable phosphor and a cured resin, which is prepared by the steps of vacuum-depositing a stimulable phosphor on the support to form a deposited layer of a stimulable phosphor, impregnating the deposited layer with a thermosetting resin, an ultraviolet-curing resin or an electron beam-curing resin, and curing the impregnated resin.

* * * * *